United States Patent [19]

Randmae

[11] 4,023,522

[45] May 17, 1977

[54] ATTENUATION SPOT FILTERS AND MANUFACTURING PROCESS

[75] Inventor: Rein Randmae, Fort Salonga, N.Y.

[73] Assignee: Vicon Industries, Inc., Farmingdale, N.Y.

[22] Filed: June 29, 1976

[21] Appl. No.: 700,791

Related U.S. Application Data

[62] Division of Ser. No. 576,027, May 9, 1975.

[52] U.S. Cl. .................................. 118/47; 118/321
[51] Int. Cl.² .......................................... B05C 11/00
[58] Field of Search ............. 118/47, 321, 48, 318; 427/223; 350/314, 205

[56] References Cited

UNITED STATES PATENTS

| | | | |
|---|---|---|---|
| 2,626,874 | 1/1953 | Pipkin | 118/47 |
| 3,167,080 | 1/1965 | Flarsheim | 118/318 |
| 3,324,824 | 6/1967 | Palmer et al. | 118/47 |
| 3,520,278 | 7/1970 | Blackwell | 118/47 |
| 3,713,419 | 1/1973 | Skooglund | 118/47 |

Primary Examiner—Ronald Feldbaum
Attorney, Agent, or Firm—Stoll and Stoll

[57] ABSTRACT

An attenuation spot filter adapted to extend the light intensity range of usefulness of cameras, particularly television cameras, by attenuating the input light intensity in accordance with reduced iris aperture, comprising an optical element having at its center a thin film coating the density of which decreases in a radially outward direction whereby light attenuation is a minimum at maximum iris aperture and is maximum at minimum iris aperture.

The attenuation spot filter is manufactured by a thin film carbon deposit of controlled thickness and diameter onto an optical flat which is, after deposition, coated. The flat is held horizontally for vertical axial rotation about a controlled flame, with the distance between the flame and the flat being cam-controlled and with the flame jet being secured for vertical axial movement with a cam follower. The coating is float-applied for uniformity and the coating material is an alkyd resin and lacquer thinner mixture.

3 Claims, 14 Drawing Figures

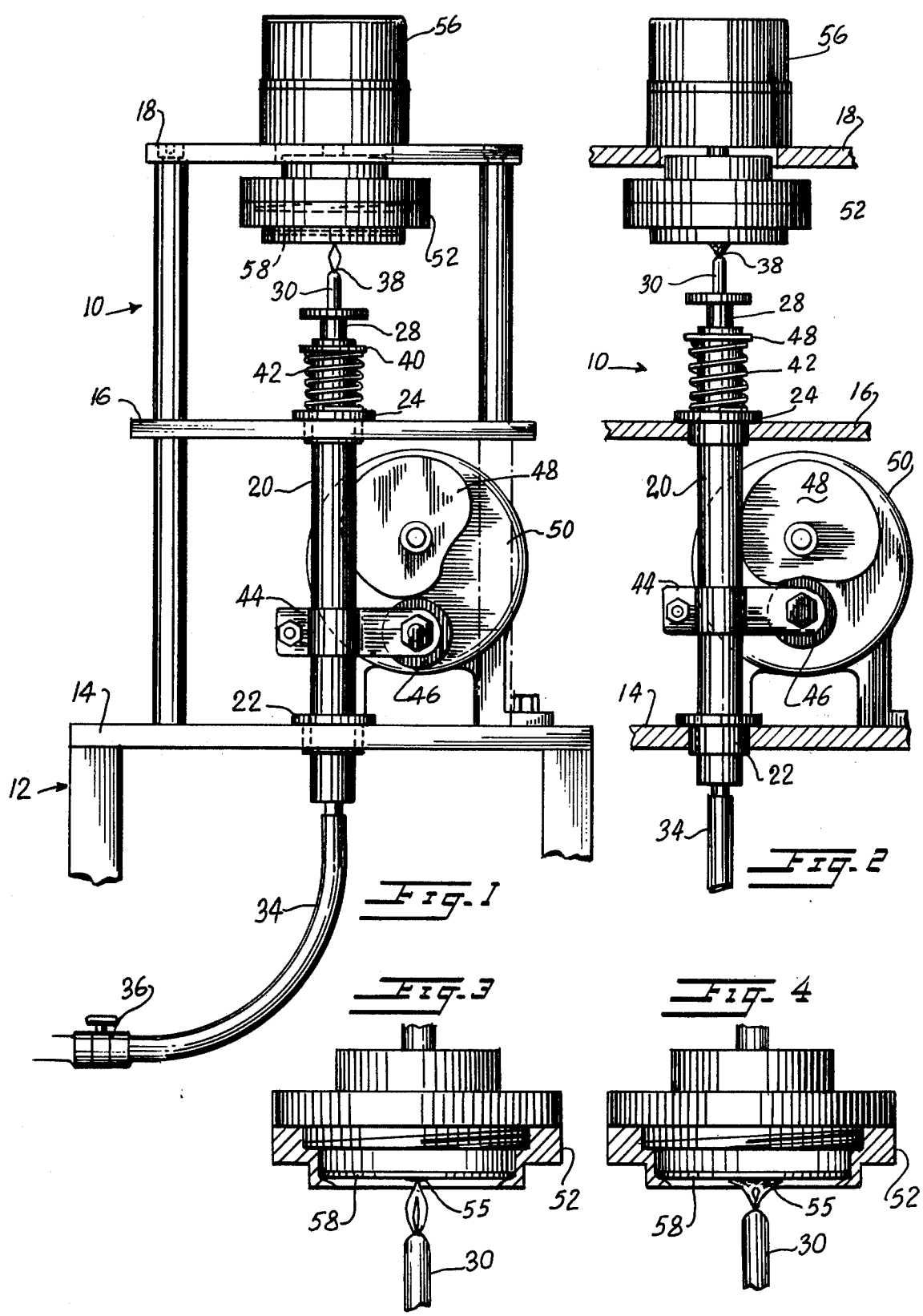

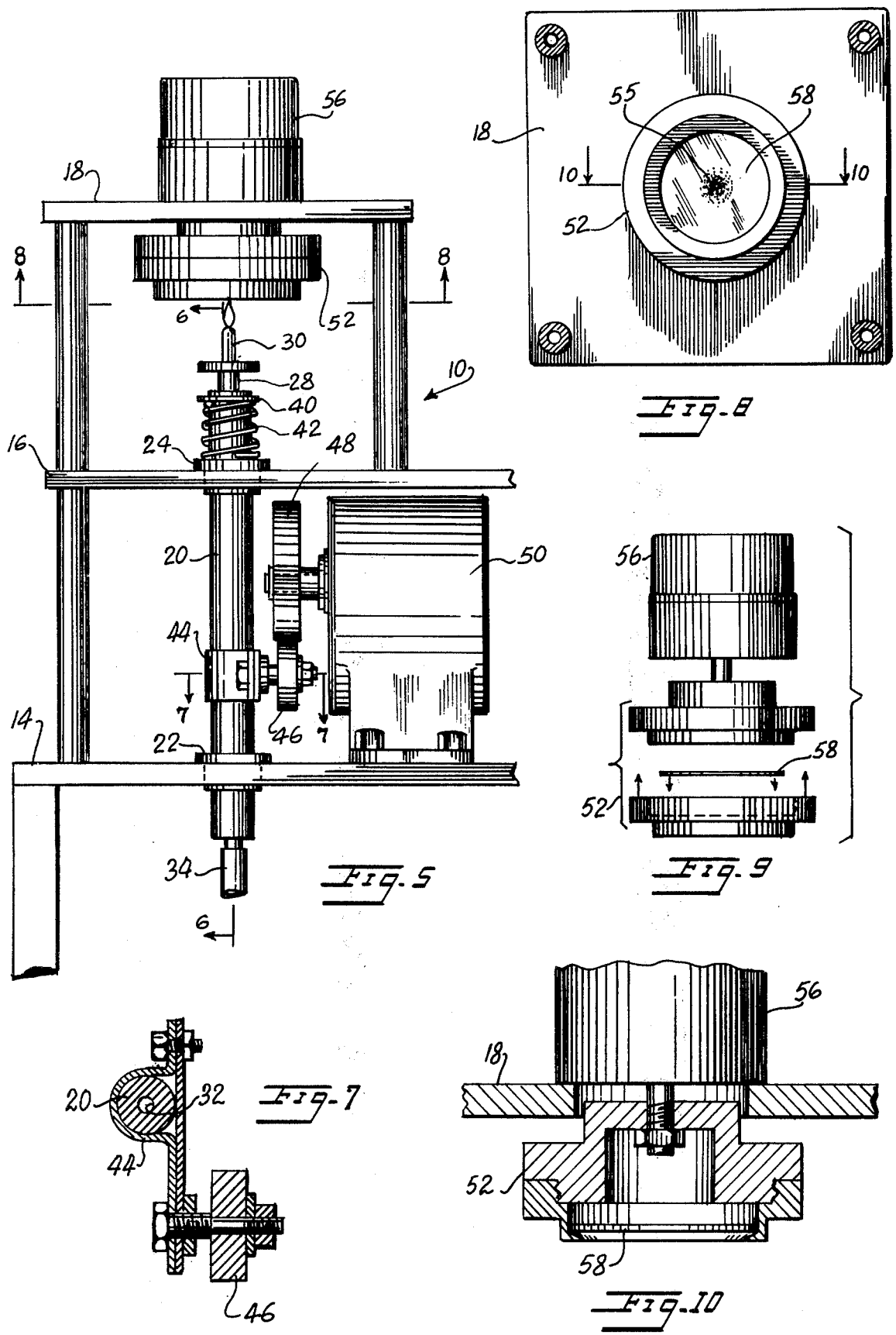

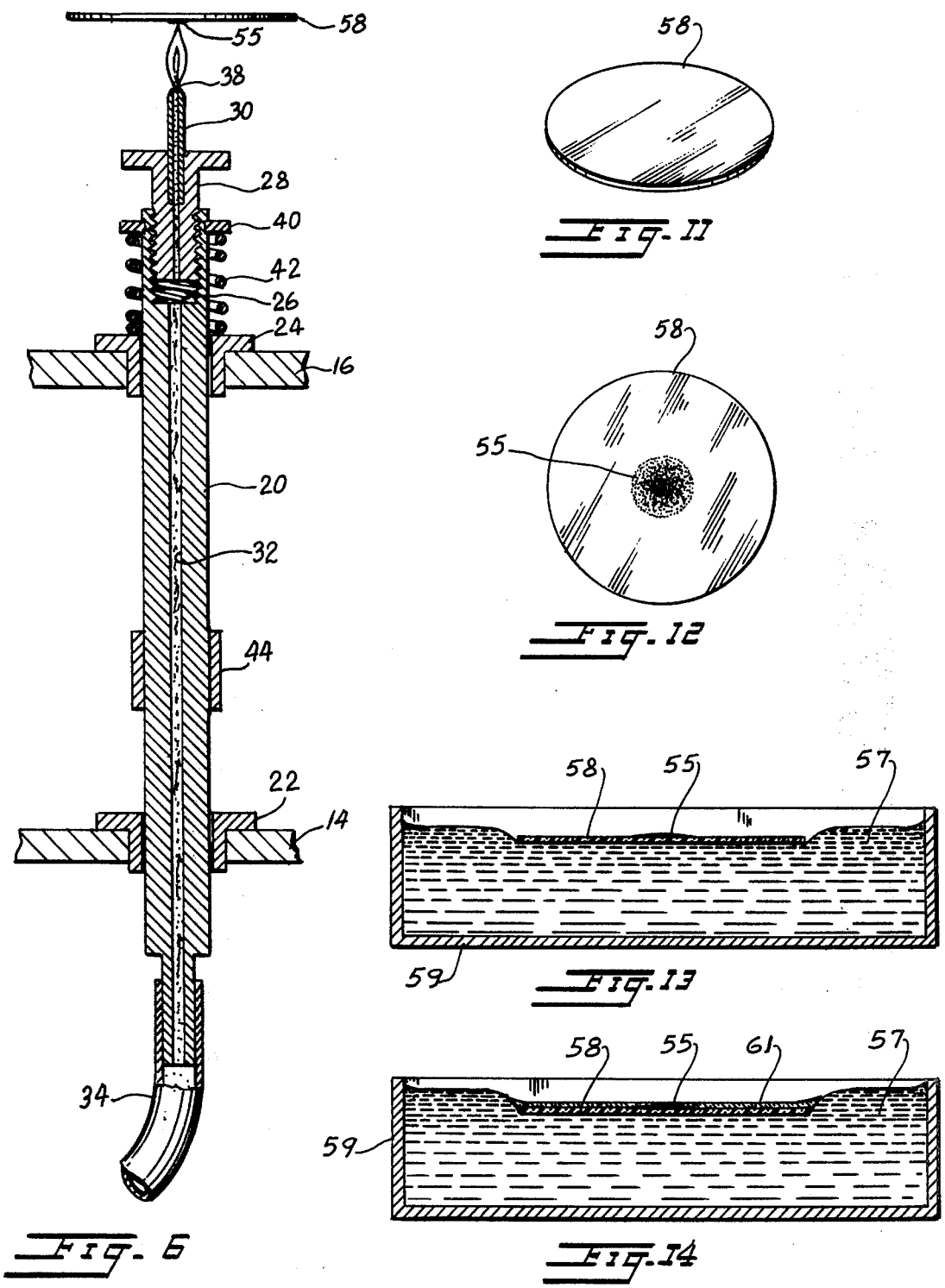

ATTENUATION SPOT FILTERS AND MANUFACTURING PROCESS

REFERENCE TO RELATED APPLICATION

This application is a divisional of copending U.S. patent application Ser. No. 576,027, filed May 9, 1975 and entitled Attenuation Spot Filters and Manufacturing Process. In addition, this application is related to copending U.S. patent application Ser. Nos. 700,792 and 700,793, each filed even date herewith and each being a divisional of said application Ser. No. 576,027.

BACKGROUND OF THE INVENTION

Present television cameras are limited in useful light intensity differentials whereby a sensitive television camera, suitable for low light level input, will be overloaded or damaged by high light level inputs, requiring light reducing filters to be interposed. Conversely, high level cameras will be insensitive to low light level inputs. The present invention provides a means for extending the useful light input range of a television camera.

Conventional photographic cameras and most television cameras are provided with lenses having variable aperture irises to vary the amount of light permitted to fall upon the photosensitive elements. Since irises are mechanical, they are limited in their range of light attenuation, with an iris range up to $f/22$ being common. Accordingly, other means of additional light attenuation is required. One method of reducing the amount of light passing through an iris at its maximum closure is by the use of a spot filter, that is, an optical element having a spot of greater filtering power in optical alignment with the iris. The effect of the relatively small filtering area is that, when the iris is at its maximum closure, all light passes through the spot filter thereby greatly attenuating the light which passes through to the photosensitive elements. An iris range of up to $f/400$ or $f/500$ is possible. Conversely, when the iris is fully opened, the effect of the relatively small filtering area, when placed close to the iris on the optical axis, is minimal, generally about ⅛ $f$ stop. As the iris gradually closes, the effect of the spot becomes more and more pronounced and attenuation is greatly increased.

Many television cameras are provided with automatic iris drives to mechanically adjust the iris for desired light attenuation. It is accordingly important that, at any point throughout the iris range, the density gradient of the spot filter not become so steep as to cause any of the automatic lens control or automatic iris drives to be activated improperly. It will be seen that the density gradient of the spot filter must be carefully controlled.

The method of manufacture of the attenuation spot filter of the present invention provides the required careful control of the density gradient of the spot.

SUMMARY OF THE INVENTION

The present invention provides a light-attenuating filter having a centrally located filtering spot the density of which is greatest at its center and the density of which gradates in accordance with a predetermined rate of descent of density. Such rate of descent is preferably non-linear.

The attenuation spot filter of the present invention is manufactured by a carbon deposition process provided by a flame discharge impinging upon a horizontally disposed optical flat. The distance between the flame and the flat, and the time of impingement at each such distance, is controlled by a motor driven cam which engages a follower joined to the discharge orifice of the flame. The optical flat is rotated about a vertical axis coincident with the axis of the orifice to obtain uniformity of deposition circumferentially of the axis.

Following deposition, the optical flat together with the carbon film deposit thereon, is coated to preserve the deposit. To insure complete uniformity of coating thickness, a floatation method of coating is provided.

DESCRIPTION OF THE DRAWING

FIG. 1 is a front view of the carbon deposition apparatus of the present invention. The cam is rotated such that the flame is a greater distance from the optical flat than is shown in FIG. 2.

FIG. 2 is a view similar to that of FIG. 1 except that the cam is rotated such that the flame is relatively closer to the optical flat than is shown in FIG. 1.

FIG. 3 is an enlarged view, partly in cross-section, of the chuck, substrate and flame in the position shown in FIG. 1.

FIG. 4 is an enlarged view partly in cross-section, of the chuck, substrate and flame in the position shown in FIG. 2.

FIG. 5 is a side view of the apparatus shown in FIG. 1.

FIG. 6 is a cross-sectional view, enlarged, taken across line 6—6 of FIG. 5.

FIG. 7 is a cross-sectional view taken across line 7—7 of FIG. 5.

FIG. 8. is a cross-sectional view taken across line 8—8 FIG. 5, showing the optical flat mounted in the chuck.

FIG. 9 is an exploded view of the chuck, optical flat and chuck drive motor.

FIG. 10 is a cross-sectional view, enlarged, taken across 10—10 of FIG. 8.

FIG. 11 is a perspective view of the blank optical flat used in the present invention.

FIG. 12 is a plan view of the attenuation spot filter of the present invention.

FIG. 13 is a cross-sectional view of the floatation fluid container showing an uncoated attenuation spot filter on the surface of the fluid. Thickness of the carbon spot and of the coating are not to scale.

FIG. 14 is a view similar to that of FIG. 13 but showing the attenuation spot filter coating.

DESCRIPTION OF A PREFERRED EMBODIMENT OF THE INVENTION

Referring to the drawing, the carbon deposition apparatus 10 of the present invention comprises a three-stage support 12 having a first stage 14, a second stage 16 and a third stage 18, each stage being horizontally disposed, one above the other, with first stage 14 being lowermost and third stage 18 being uppermost.

A vertical shaft 20 extends through bushings 22 and 24 vertically disposed in lower stage 14 and middle stage 16, respectively, such that shaft 20 is secured for vertical axial movement in the bushings. Threaded into a recess 26 provided for the purpose in the top of shaft 20 is a threaded adaptor 28 which secures an aperture tube 30. Aperture tube 30, adaptor 28 and shaft 20 are coaxial about a vertical axis. Extending longitudinally through shaft 20, adaptor 28 and aperture tube 30, and communicating from top to bottom thereof, is a gas port 32, the lower end of which is coupled by means of a supply tube 34 to a gas supply, not shown. The gas supply pressure is adjustably regulated by regulator 36, shown schematically in FIG. 1. The gas exits at orifice 38 in the top of aperture tube 30. Orifice 38 is coaxial with the vertical axis of shaft 20.

The upper portion of shaft 20, above second stage 16, is provided with a collar 40. A coil spring 42, coaxial with shaft 20, is disposed between collar 40 and bushing 24 and urges the collar, shaft 20, adaptor 28 and aperture tube 30 vertically upwardly.

Clamped to shaft 20 by means of clamp 44 in a roller follower 46 which engages against and is driven by a cam 48 supported on the shaft of a variable speed motor 50. Because roller follower 46 is located below cam 48, it engages upwardly against the cam by urging of spring 42.

It will be seen that vertical movement and positioning of orifice 38 is controlled by cam 48 as it rotates with variable speed motor 50. Thus, as seen in FIG. 1, the cam contour engaged with roller follower 46 urges orifice 38 downwardly as compared to the cam contour engaged with roller follower 46 in FIG. 2 wherein orifice 38 is at a higher position.

Secured to upper stage 18 is a chuck 52 and a chuck drive motor 56. Chuck 52 secures a substrate 58 horizontally above orifice 38 and concentrically with the vertical axis of shaft 20 for rotation about said axis.

With the basic structure of the apparatus now described, the carbon deposition process may be easily understood. The gas supply is turned on and the gas exiting through orifice 38 is ignited to form a flame which is controlled by size of orifice 38 and by the pressure of the gas supplied to the orifice. A substrate 58 of appropriate material, diameter and thickness is cleaned and is attached to chuck 52 which is then placed into position above the gas flame. Chuck motor 56 is turned on to rotate the substrate. A cam 48, having been selected for appropriate contour necessary to the ultimate use of substrate 58, is mounted on the shaft of variable speed motor 50. The cam is rotated to the beginning of the cycle and the motor is adjusted to the required speed.

As the cam rotates, shaft 20, adaptor 28, aperture tube and the gas flame are allowed to rise vertically until the flame contacts the substrate and deposits a film or spot of carbon 55 on the lower surface thereof. The shape of the cam is such that the tip of the flame first contacts the central portion of the substrate as shown in FIG. 3 and then, as orifice 38 is brought closer to the substrate, the flame is allowed to spread out on the substrate to encompass a larger area as shown in FIG. 4. The time that the flame occupies at the center of the substrate is greater than the time it occupies in the spread out condition circumferential of the center of the substrate and, therefore, the carbon deposition is greater at the center than radially outwardly thereof. It is accordingly possible to create a carbon spot 55 which is densest at its center and which has a gradient which is reduced in a radially outward direction from the center of the spot. Due to continuing rotation of the substrate, the carbon deposition process is uniform circumferentially about the axis of rotation, which axis is at the center of the spot deposited on the substrate. At the completion of the deposition process the cam will have rotated such that orifice 38 is lowered away from the substrate and the flame is extinguished by shutting the gas supply. The motors are turned off and the substrate, bearing its thin film carbon deposit 55, is very carefully removed from the chuck.

To protect the carbon deposit from the effects of handling and ambient conditions, particularly humidity, a coating of a clear resin is applied. To maintain uniform optical characteristics, it is necessary to achieve a resin coating of uniform thickness. To achieve such a uniform thickness, substrate 58 is placed on the surface of water or other floatation fluid 57 in a small container 59 so that it can be held perfectly horizontal during application of the coating. The surface of the substrate which has the thin film carbon deposit 55 is faced upwardly so not to contact the water. The substrate is able to float slightly below the surface of the water, forming a well due to the surface tension of the water as well as the physical characteristics of the substrate itself, namely its dimensions including weight. The upper surface of the substrate, the surface bearing the carbon deposit, is coated with a prescribed amount of liquid resin 61. The resin spreads out to a thin uniform thickness throughout the well (except at the edge thereof) and is then permitted to dry. After resin 61 has dried, the coated substrate can beseparated and removed from the water. The slight additional resin thickness at the substrate edge, formed by the surface tension of the liquid resin, is not objectionable since the edge is not in the ultimate optical path.

It is important, throughout the deposition and coating process; to keep all dust and foreign matter from getting on to the substrate or the resin coating. Any such foreign material will produce a surface irregularity which will reduce or impair the optical characteristics of the attenuation spot filter.

The substrate used may be any optical flat, such as optical quality glass. The resin which is used for the protective coating may be of the alkyd type. The preferred coating is a mixture of an alkyd resin, including suitable mineral spirits and dryers, and a lacquer thinner, in equal amounts by volume. Valoil, a trademark of Valspar Corporation of Rockford Ill., is a suitable resin including linseed,soya, ester gum, mineral spirits and dryers, and a lacquer thinner sold by Sealed Liquids Products Co., Inc., of New York City is also suitable.

It will be noted that aperture tube 30 is threaded not only for ease of interchangeability of orifice sizes, the useful range of which may be from approximately 0.005 in. to approximately 0.030 in., but also to permit fine adjustment of flame-to-substrate distance.

The attenuation spot filter of the present invention, when used with television cameras, allows a sensitive camera to operate under conditions of partial darkness at large iris openings with the relatively small high density area at the center of the optical path causing almost negligible interference, yet permits operation at high light levels by its great light attenuation across the area of small iris openings. Operating light ranges of the camera lens is uninterrupted as the iris ranges from highest to lowest lens $f$ stop.

An ideal spot will have a central dense diameter approximately equal to or slightly greater than the smallest iris aperture. The density then tapers off gradually to become zero at the edge of the spot. It has been determined that an overall spot size equivalent to the iris aperture diameter of about $f/8$ for an $f/2$ lens produces acceptable results without excessive light loss at full open aperture.

A central density of about ND 2.5 is readily attainable with this process and produces good results with most sensitive cameras. A repeatability tolerance of approximately 0.02 inches can be held on both the densest and overall diameters of the spot. The central density can be held to ND 0.2 by comparative densitometry. Closer tolerances on both size and density can be held by selective inspection techniques of the finished spot.

While the foregoing is illustrative of a preferred embodiment of the invention, it is clear that other embodiments may be had within the teachings hereof.

What is claimed is:

1. A machine for manufacturing an attenuation spot filter, comprising:
    a. vertically-movable aperture tube containing a gas discharge orifice.
    b. a substrate horizontally disposed above said gas discharge orifice,
    c. rotating means for rotating said substrate about a vertical axis,
    d. vertical control means for controlling the vertical distance between said gas discharge orifice and said substrate, and
    e. a gas supply in delivery communication with said gas discharge orifice,
    f. whereby carbon is deposited on said substrate by a flame ignited at said gas discharge orifice.

2. A machine for manufacturing an attenuation spot filter in accordance with claim 1, wherein said vertical control means comprises:
    a. a shaft, said shaft being secured for vertical movement in conjunction with said aperture tube,
    b. a motor-driven cam, and
    c. a cam follower, said cam follower being securd to said shaft for vertical movement in conjunction therewith, being in spring-engagement with said cam and being vertically driven by said cam,
    d. whereby the vertical distance between said gas discharge orifice and said substrate is controlled by said cam.

3. A machine for manufacturing an attenuation spot filter in accordance with claim 1, wherein:
    said vertical axis of rotation of said substrate is co-axial with the center of said gas discharge orifice.

* * * * *